United States Patent
Egner et al.

(10) Patent No.: US 10,173,190 B2
(45) Date of Patent: Jan. 8, 2019

(54) FIBRE-OBTIC TEMPERATURE MEASUREMENT IN A CATALYST MATERIAL

(71) Applicant: MAN DIESEL & TURBO SE, Augburg (DE)

(72) Inventors: Franz Egner, Rinchnach (DE); Rolf Bank, Deggendorf (DE); Andreas Bauer, Aicha vorm Wald (DE); Dieter Verbeek, Eging am See (DE); Martin Lainer, Deggendorf (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 15/537,347

(22) PCT Filed: Dec. 17, 2015

(86) PCT No.: PCT/EP2015/080308
§ 371 (c)(1),
(2) Date: Jun. 16, 2017

(87) PCT Pub. No.: WO2016/097190
PCT Pub. Date: Jun. 23, 2016

(65) Prior Publication Data
US 2017/0368523 A1    Dec. 28, 2017

(30) Foreign Application Priority Data

Dec. 19, 2014   (DE) .................. 10 2014 018 825

(51) Int. Cl.
*B01J 8/06*   (2006.01)
*B01J 8/00*   (2006.01)

(52) U.S. Cl.
CPC .............. *B01J 8/067* (2013.01); *B01J 8/001* (2013.01); *B01J 2208/00061* (2013.01);
(Continued)

(58) Field of Classification Search
CPC .. B01J 8/067; B01J 8/001; B01J 2208/00061; B01J 2208/00176; B01J 2208/00194
See application file for complete search history.

(56) References Cited

U.S. PATENT DOCUMENTS

| | | | |
|---|---|---|---|
| 7,835,605 B1 | 11/2010 | Wang | |
| 8,524,156 B2 * | 9/2013 | Bank | B01J 8/067 374/137 |

(Continued)

FOREIGN PATENT DOCUMENTS

| | | |
|---|---|---|
| DE | 10 2004 031 324 | 1/2006 |
| EP | 0 873 783 | 10/1998 |

(Continued)

OTHER PUBLICATIONS

Canning, J. et al.: Regenerated gratings, Journal of The European Optical Society—Rapid Publications 4, 09052 (2009) [doi: 10.2971/jeos.2009.09052].

(Continued)

*Primary Examiner* — Lessanework Seifu
(74) *Attorney, Agent, or Firm* — Cozen O'Connor (57) ABSTRACT

A tube reactor for heterogeneous catalyzed gas phase reactions having a thermal tube with a catalyst material around which a fluid heat transfer medium, a temperature-sensitive optical waveguide surrounded by a capillary tube that extends into the catalyst material and has measuring points having a predetermined spacing between adjacent measurement points, and can be connected to a source for optical signals and to an evaluation unit (31) for optical signals reflected by the optical waveguide. The optical waveguide has measuring points having a spacing between adjacent measuring points in the axial direction of the thermal tube which is 0.8 to 5 times the shortest edge length of all imaginary cuboids which, having a minimum volume in the (Continued)

cases in which nominal external dimensions are associated with particles of the catalyst material.

20 Claims, 6 Drawing Sheets

(52) U.S. Cl.
CPC ............... *B01J 2208/00194* (2013.01); *B01J 2208/00672* (2013.01); *B01J 2208/065* (2013.01)

(56) References Cited

U.S. PATENT DOCUMENTS

2006/0065064 A1  3/2006  Richard et al.
2011/0166367 A1  7/2011  Gross
2014/0290343 A1  10/2014  Kulkarni et al.

FOREIGN PATENT DOCUMENTS

| | | |
|---|---|---|
| EP | 1 270 065 | 1/2003 |
| EP | 1 484 299 | 12/2004 |
| EP | 2 075 058 | 7/2009 |
| JP | 07-103830 | 4/1995 |
| JP | 2000-088676 | 3/2000 |
| JP | 2003-001094 | 1/2003 |
| JP | 2009-148757 | 7/2009 |
| WO | WO 2014/056588 | 4/2014 |

OTHER PUBLICATIONS

Office Action dated May 28, 2018 which issued in the corresponding Japanese Patent Application No. 2017-532857.

* cited by examiner

| Δx | residue | mass density $q_3(x)$ | mass sum $R(x)$ |
|---|---|---|---|
| [mm] | [g] | [ - ] | [ - ] |
| 3.40 | 0.000 | 0.000 | 1.000 |
| 3.45 | 0.000 | 0.000 | 1.000 |
| 3.50 | 0.582 | 0.005 | 1.000 |
| 3.55 | 1.284 | 0.012 | 0.995 |
| 3.60 | 1.561 | 0.014 | 0.983 |
| 3.65 | 1.848 | 0.017 | 0.968 |
| 3.70 | 2.252 | 0.021 | 0.951 |
| 3.75 | 3.013 | 0.028 | 0.931 |
| 3.80 | 3.967 | 0.037 | 0.903 |
| 3.85 | 6.943 | 0.064 | 0.866 |
| 3.90 | 10.783 | 0.099 | 0.802 |
| 3.95 | 13.451 | 0.124 | 0.703 |
| 4.00 | 16.107 | 0.149 | 0.579 |
| 4.05 | 15.678 | 0.145 | 0.430 |
| 4.10 | 9.237 | 0.085 | 0.285 |
| 4.15 | 5.152 | 0.048 | 0.200 |
| 4.20 | 4.030 | 0.037 | 0.153 |
| 4.25 | 3.849 | 0.036 | 0.116 |
| 4.30 | 2.646 | 0.024 | 0.080 |
| 4.35 | 3.000 | 0.028 | 0.056 |
| 4.40 | 1.117 | 0.010 | 0.028 |
| 4.45 | 0.758 | 0.007 | 0.018 |
| 4.50 | 0.359 | 0.003 | 0.011 |
| 4.55 | 0.392 | 0.004 | 0.007 |
| 4.60 | 0.413 | 0.004 | 0.004 |
| 4.65 | 0.000 | 0.000 | 0.000 |
| 4.70 | 0.000 | 0.000 | 0.000 |
| sum | 108.422 | | |

FIBRE-OBTIC TEMPERATURE MEASUREMENT IN A CATALYST MATERIAL

CROSS REFERENCE TO RELATED APPLICATIONS

This is a U.S. national stage of application No. PCT/EP2015/080308, filed on Dec. 17, 2015. Priority is claimed on German Application No. DE102014018825.6, filed Dec. 19, 2014, the content of which is incorporated here by reference.

BACKGROUND OF THE INVENTION

1. Field of the Invention

The invention relates to a tube reactor.

2. Description of Prior Art

To carry out heterogeneous catalysed gas-phase reactions, such as oxidation, hydration, dehydration, nitration, or alkylation processes have proven themselves in the chemical industry, particularly tube reactors as a particular type of fixed-bed reactors. Tube reactors with only one tube are preferably used as pilot or laboratory reactors. If a multiplicity of reaction tubes are arranged in parallel to form a bundle, then one speaks of a tube-bundle reactor.

A tube bundle reactor of this type has a reactor main part with a bundle of vertically running reaction tubes, in which for the most part granular catalyst and also inert material is located. The reaction tubes are fastened in a sealing manner at the ends thereof in an upper or in a lower tube sheet. The tube bundle is enclosed by a reactor jacket. The reaction gas mixture is discharged to the reaction tubes via a reactor cover spanning the relevant tube sheet and from the reaction tubes as a product gas mixture via a reactor cover spanning the other tube sheet. The reaction may be endothermic or exothermic. Stable reaction conditions are created in that a heat-transfer medium flows through the outer sides of the reaction tubes and in that a defined heat transfer is ensured in the process. When promoting a heat transfer which is as good as possible, the heat transfer can be achieved in the case of a heat-transfer medium without phase change in that the reaction tubes are flowed through transversely. In the case of large tube-bundle reactors, the heat-transfer medium is often guided through an annular tube bundle in a meandering manner using annular and disc-shaped baffle plates. The heat-transfer medium is distributed through a circulating device located outside of the reactor via annular channels to the reactor circumference and flows via a multiplicity of jacket openings into the jacket area of the reactor. The heated heat-transfer medium exiting the reactor is cooled in a cooler located outside of the reactor. A temperature profile along the reaction tubes optimized for the respective process can be set by a suitable flow management. Furthermore, cooling with an evaporating heat-transfer medium such as water is known.

In heterogeneous reactions, the chemical reactions only take place on the surface of the catalyst particles. The transition of the reaction front takes place at the contact point of two catalyst particles. This contact point constitutes a site with a locally reduced catalyst offering. Accordingly, the chemical reaction is somewhat weaker locally here. The heat development therefore has a wave-shaped course with maxima in the region of the catalyst particles and minima at the contact points of the same. Support of the reaction by thermal conduction from one particle to the other only plays a subordinate role due to the low thermal conductivity of the mostly ceramic base material.

In a series of catalytic gas phase reactions, particularly in the case of catalytic partial oxidation reactions, in the start region of the reaction tube there is an increased heat development with the formation of a temperature maximum, the so-called "hotspot". Depending on the type of reaction, this hotspot is differently pronounced in the axial extent and in the level of the temperature maximum. In this respect for example, reactions for producing maleic anhydride, phthalic anhydride, and methanation of CO or CO2 show pronounced temperature maxima. Thus, with respect to the total reaction, the hot spot is a normal occurrence and therefore to be seen as an operational hot spot. For stable operation, the hotspot is controlled as described at the beginning of cooling using a heat-transfer medium circulating the reaction tubes.

Depending on the reaction rate, the raw materials are converted into the products until the raw materials are consumed. If the raw material is substantially converted, the heat release in the case of fast reactions almost suddenly drops to about zero and the cooling of the reaction tube ensures that the reaction gas mixture quickly takes on the temperature of the heat-transfer medium. Depending on the reaction rate, the hot spots may have an axial extent of only a few catalyst particles.

In regions of the hot spots, there is a particular risk that the reactions are not implemented for the desired product, but rather for example in the case of partial oxidation reactions, a complete oxidation of the raw materials takes place. In these cases, an irregular hot spot with temperatures far above 700° C. may develop quickly. This irregular hot spot can migrate further counter to the flow direction as far as the reaction tube inlet and there cause the reaction gas mixture located in the reactor inlet cover to explode. In this context, one also speaks of a "runaway" of the reaction.

The detection of the temperature inside the catalyst charge in the axial direction is of decisive importance for assessing the course of the reaction in the reactor and for optimal control of the reaction process with regards to product quality and conversion. Knowing the hot-spot temperature is of exceptional importance during operation, so that the process can be changed accordingly if a permitted temperature is exceeded. Otherwise, the catalyst may be damaged with an impairment of conversion, selectivity and yield. The monitoring of the hot-spot temperature is particularly important in the case of exothermic reactions, because here a relatively large quantity of heat is released in a short time, which is found in a corresponding temperature increase of the reaction gas mixture.

Thus, various systems have been developed for measuring the reaction temperatures along a reaction tube. In order to limit the technical outlay, the temperatures are only measured in a few representative reaction tubes. To this end, so-called thermotubes are used. These are particular reaction tubes with temperature measuring devices, in which however, to the greatest extent possible, the same reaction conditions as in the reaction tubes without temperature measuring devices are otherwise set. Essentially, three methods are used for temperature measurement. In all methods, a protective tube is generally guided centrally into the thermotube and fixed in its position using spacers. Subsequently, catalyst is introduced into the annular space between outer wall of the protective tube and inner wall of the thermotube. Then, a thermometer is introduced into the protective tube, which is realized as a thermocouple or as a resistance thermometer. Thermocouple are preferably used due to their relatively small design. To limit the influence of different bulk densities between a thermotube and a fault-free reaction tube, caused by the boundary effects at the outer circumference of the protective tube, on the reaction conditions and therefore on the temperature profile measured in the thermotube, the outer diameter of the protective tube is designed to be as small as possible. On the other hand, great value is placed on sufficient stability and sufficient space for the faultless introduction of the thermometer into the protective tube. The realization of the protective tube with an outer diameter of 6.0 mm is widespread, protective tubes with an outer diameter of 8.0 mm are also used in exceptional cases.

Two methods for measuring the temperatures in reaction tubes of a tube reactor or tube bundle reactor are presented in EP 0 873 783 A1 and EP 1 484 299 A1. In this case, either an axially movable individual thermometer or a stationary stage thermometer is used. Both thermometers are preferably located on the tube axis in a protective tube.

In the first method, an individual thermometer is guided in an axially movable manner in the protective tube. The use of only one individual thermometer allows the use of protective tubes with small diameters, as a result of which the influence on the occurrence of the reaction is minimized. Although the temperature profile can be detected gaplessly along the entire length of the reaction tube using this method. The measured values are not available immediately, but rather only with a temporal delay determined by the system. Critical process sections, such as the start-up process, the reaction behaviour in the event of concentration changes or the development and progression of irregular hot spots cannot be monitored reliably, so that only stationary processes can be monitored in a meaningful way using this approach. In addition, the device is very mechanically sensitive.

In the second method, a plurality of thermometers are arranged axially at different fixed positions in the protective tube. This axially multiple arrangement of thermometers is also termed a "multipoint thermometer" or a "stage thermometer". Here, the temperatures of all individual measuring points are available at the same time. At critical regions with pronounced temperature maxima, the local resolution can be increased by reducing the spacings of the measuring points. A stage thermometer has approx. 10 to 15 measuring points, which have spacings of between 200 mm and 400 mm from one another. If a hot spot moves or is created between two measuring points, particularly in regions with a lower measuring-point density, it is not possible to determine this.

In a third method, which is described in EP 2 075 058 A1, a stage thermometer covers the distance between two neighbouring measuring points using an automated positioning device, as a result of which short working paths and short times for recording a continuous temperature profile over the entire length of a thermotube result.

In WO 2014/056588 A1, a fibre-optic temperature measurement is used for optimizing the heat-transfer-medium flows in a heat exchanger without chemical reactions. Here, an optical signal is coupled into a temperature-sensitive optical waveguide. The reflected optical signals are converted into temperatures by an evaluation unit and thus enable the determination of the temperature distribution along the optical fibre. Here, various physical effects, such as Raman scattering, Rayleigh scattering, Brillouin scattering, or scattering on a Bragg grating, may be utilized.

In the case of Raman scattering, one here makes use of the effect that lattice vibrations are induced in an optical waveguide due to the thermal effects. These lattice vibrations are temperature-dependent. If light impinges onto the molecules of the optical waveguide, then interactions with the same result, which one terms Raman scattering. The backscattered light consists of three spectral groups. The first group consists of Rayleigh scattering. This corresponds to the wavelength of the irradiated light. In addition, there is a Stokes band shifted to higher wavelengths and an anti-Stokes band shifted to smaller wavelengths, wherein the first is not temperature-dependent and the second is temperature-dependent. Using frequency technologies (OFDR: Optical Frequency-Domain Reflectometry) or pulse technologies (OTDR: Optical Time-Domain Reflectometry), it is possible to determine the temperature along the fibre in a locally resolved manner. In the latter, the scattering level and scattering location are determined from the transit-time difference between sending out and detection of the light pulses.

In temperature determination by the evaluation of Rayleigh scattering, the properties of optical waveguides are utilized. These have local refractive index fluctuations or defects, which are statistically distributed over the fibre and act as distributed reflectors. If laser light is coupled into this optical waveguide, then the backscattered Rayleigh light is spatially scanned with high resolution by a type of transit-time measurement. A characteristic pattern is created along the fibre, which is stable and reproducible. This pattern is changed in a unique manner by temperature or strain changes, so that the pattern can be converted into temperatures and strains using frequency or pulse technologies. Resolutions smaller than or equal to 0.1 mm are possible using this method. A measuring device can break the signals down into segments with a length of e.g. at least 1 mm.

Brillouin scattering can furthermore be used for temperature determination in optical waveguides. This is a type of optical scattering, which is based on an interaction of optical waves with acoustic lattice vibrations. The temperature change is calculated with the aid of a wave previously coupled into the optical waveguide and subsequently backscattered, the frequency of which wave is reduced as a function of the temperature. Using this method, a continuous temperature profile can likewise be determined along an optical waveguide.

A further method used for fibre-optic temperature measurement is scattering on the Bragg grating. These Bragg gratings, also termed fibre Bragg gratings, are optical band filters inscribed in optical waveguides, which band filters have different refractive indices than the optical waveguides. They reflect light with a certain wavelength. Often, each Bragg grating has its own wavelength. As a result, the location of the measured temperature is uniquely identifiable. The wavelength of a Bragg grating changes as a function of temperature and strains. If only temperature shall be measured, then the optical waveguide must be strain-relieved, in measurements of strains only, the temperature influence must be compensated.

The standard measurement range for temperature measuring devices with Bragg gratings generally extends to approximately 300° C. The measurement range can however be extended considerably if the Bragg gratings are heat-treated. From "Canning, J. et al.: Regenerated gratings, Journal Of The European Optical Society—Rapid Publications 4, 09052 (2009) [doi: 10.2971/jeos.2009.09052]", Bragg gratings are known with a temperature resistance up to 1100° C., which Bragg gratings were created by a regeneration method. In U.S. Pat. No. 7,835,605 B1 for example, inscribing Bragg gratings into an optical fibre using a thermal pretreatment and post-treatment is described, as a result of which a temperature resistance of up to 1200° C. can be achieved.

DE 10 2004 031 324 A1 presents a method for determining a temperature profile in technical devices and production plants of the chemical/pharmaceutical industry using glass fibres with fibre Bragg gratings. The minimum spacing of the measuring points along the glass fibre is specified to be 5 mm. The temperature range to be checked lies between −60° C. and 1150° C.

In a production information sheet from Bayer Technology Services, a temperature measuring device named "SpectroBAY MultiTemp" is described for determining temperature profiles. The device has a plurality of channels for connecting glass fibre thermometer lines, wherein at most approximately 30 measuring points are present per fibre strand. it is time- and parallel-multiplex-capable. The temperature measurement range lies between 0° C. and 600°. A typical field of application is specified, inter alia, as temperature course measurement at tube reactors, if appropriate with a catalyst filling, and the detection of the formation of hot spots. However, with the relatively low number of measuring points, the recording of a continuous temperature profile is not possible in the case of conventional tube bundle reactors with reaction tube lengths in the range between 3 and 10 meters.

Other commercially available temperature measuring devices with optical waveguides are sold e.g. by the company Polytec. The Rayleigh scattering is evaluated in devices in the "ODiSI" range. The whole fibre constitutes a virtually continuous measuring sensor over its entire length, with a maximum resolution of 1 mm. The maximum use temperatures for standard optical waveguides is 300° C. and for special optical waveguides is 800° C. A different series has similar properties with differences in the length of the measurement paths and the resolution. Devices in the "DSS" series operate with Bragg gratings. The resolution is 1 cm, the measuring rate is 3 Hz. The Bragg gratings can be inscribed into the optical waveguide continuously, the sensor positions and sensor lengths can be configured freely.

In the case of the evaluation of Raman, Rayleigh or Brillouin scattering, the measured values are continuously present over the entire length of the optical waveguide. The evaluation of all signals with the highest possible resolution of the evaluation unit, in order to obtain a continuous temperature profile along the reaction tube, requires a very large computing capacity. Otherwise, the evaluation speed would fall so far that the temperature display would be delayed by several seconds. The fibre-optic temperature measurement with the aid of Bragg gratings conversely allows only a limited resolution, which does not guarantee a reliable detection of hot spots in all cases.

SUMMARY OF THE INVENTION

It is an object of one aspect of the invention to improve a tube reactor of the type mentioned at the beginning in such a manner that with economically viable outlay, each occurrence of hot spots can be detected reliably and virtually in real time.

The invention is based on the discovery that the initial extent, particularly of an irregular hot spot, corresponds to the size of a catalyst particle, or that the propagation speed of a hot spot inside a catalyst particle is so large that a search for hot spots that are smaller than a catalyst particle does not make any sense technically. The invention utilizes this discovery and arranges the measuring points with a spacing between neighbouring measuring points, which depends on the particle size. It has been established that for a catalyst charge, the particles of which are assigned nominal external dimensions, hot spots are detected reliably if the spacing of neighbouring measuring points in the axial direction of the thermotube is 0.8- to 5-times the shortest edge length of all imaginary cuboids, which with minimal volume delimit one particle in each case, with the assumption that the particle has its nominal external dimension. If no nominal external dimensions are assigned to the particles, it has been established that hot spots are detected reliably if the spacing of neighbouring measuring points in the axial direction of the thermotube is 0.8- to 5-times the shortest edge length of all imaginary cuboids, which with minimal volume delimit those particles in each case, which belong to a mass fraction of at least 70% of the catalyst charge, to which all particles with imaginary cuboids belong, for which each edge length is longer than the shortest edge length. In the case of such spacings between neighbouring measuring points, it is ensured that these spacings are on the one hand small enough to ensure an early detection of hot spots. on the other hand, the measures according to the invention prevent the evaluation of the measured values from being so computationally intensive, owing to spacings which are too small, that a temperature display in real time or at least virtually in real time with delays of no more than 5 seconds is only possible with a very high cost outlay. With the spacings according to the invention between neighbouring measuring points, temperature display (virtually) in real time is therefore possible with a relatively inexpensive evaluation unit, i.e. with economically viable outlay.

Using the measures according to the invention, the temperature profiles in a catalyst charge can be determined with a high resolution using a compact measuring apparatus. As an optical waveguide allows a high measuring-point density in the longitudinal direction for only a small outer diameter, on the one hand the outer diameter of the protective tube can likewise be small. As a result, the reaction is only minimally influenced and the optical waveguide therefore delivers a representative temperature profile with respect to a reaction tube without fittings. Owing to the high measuring-point density, the construction can on the other hand be stationary, i.e. not have movable parts, so that the construction is mechanically durable.

The selection of the factor 0.8- to 5-times is guided by the expected axial extent of a hot spot, which is in turn dependent on the type of the reaction. Small axial extents of the hot spot require a higher resolution with smaller spacings and vice versa.

Dynamic processes can be detected well by the simultaneous monitoring of the complete temperature profile. If a plurality of thermotubes are radially distributed in the tube bundle, a detailed temperature distribution is present in the axial and in the radial direction of the tube-bundle reactor simultaneously and recourse can quickly be had to any required measures, such as e.g. volumetric-flow or concentration changes.

A tube reactor according to the invention, in the simplest realization thereof, has a single thermotube exclusively. A tube reactor of this type can be used as a testing device for process optimization.

Figure 2:
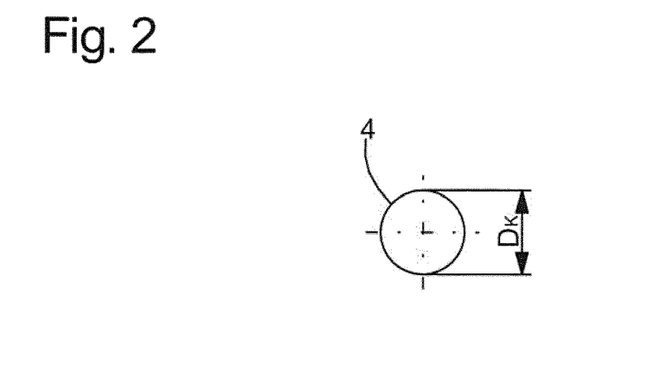
FIGS. 2 to 4 are various embodiments of catalyst particles, with the decisive external dimensions for the edge lengths of a cuboid delimiting the respective catalyst particle.
Figure 3:
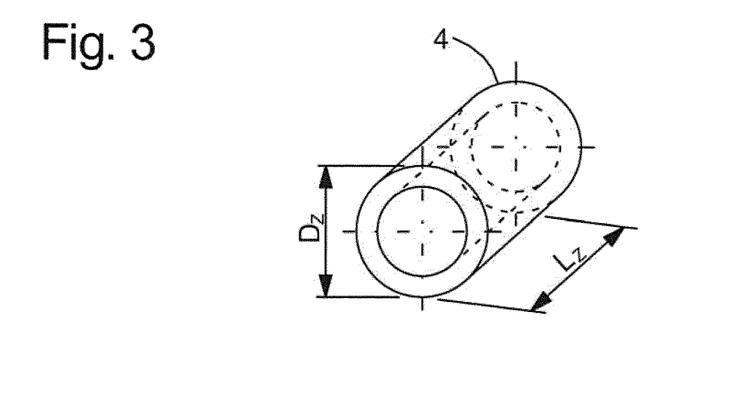
Figure 4:
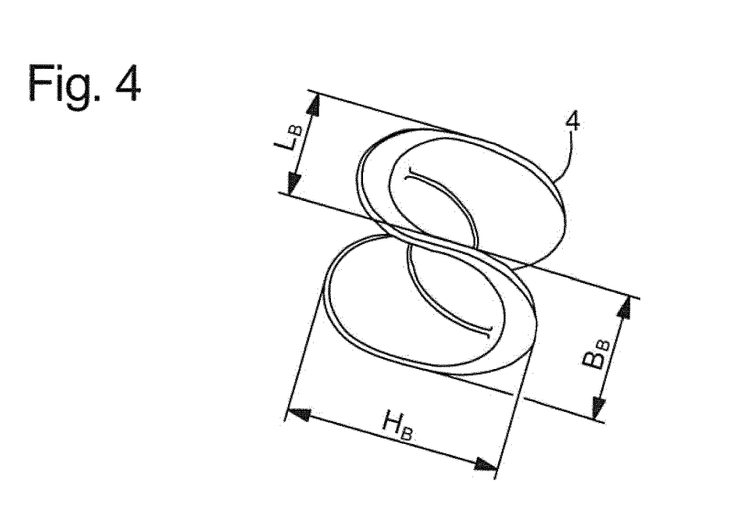

In FIGS. 2 to 4, catalyst particles in the form of a sphere, a hollow cylinder and a Berl saddle and also in each case the external dimensions thereof defining the imaginary cuboid are illustrated or specified as examples for catalyst particles and the cuboids delimiting the same with minimal volume.

In the case of a spherical catalyst particle, it is the outer diameter $D_K$ (FIG. 2). The imaginary cuboid in this case is a cube and the shortest edge length is the edge length $D_K$ of the cube.

In the case of a cylindrical or hollow-cylindrical catalyst particle, the edge lengths of the imaginary cuboid are determined by the outer diameter $D_Z$ and the length $L_Z$ of the cylinder (FIG. 3). If $D_Z<L_Z$, then the shortest edge length of the imaginary cuboid is the diameter $D_Z$. If $D_Z>L_Z$, then the shortest edge length of the imaginary cuboid is the cylinder length $L_Z$. If $D_Z=L_Z$, the imaginary cuboid is a cube and the shortest edge length is $L_Z$ or $D_Z$.

For a catalyst particle in the form of a Berl saddle, the edge lengths of the imaginary cuboid correspond to the external dimensions $L_B$, $B_B$ and $H_B$ (FIG. 4). The shortest edge length of the imaginary cuboid is the shortest of the dimensions $L_B$, $B_B$ or $H_B$.

If nominal external dimensions are assigned to the catalyst particles, that is to say in the case of the examples given above, nominal values are assigned to the external dimensions mentioned, then according to the invention, the edge lengths of the imaginary cuboid correspond to these nominal external dimensions of the catalyst particles.

If no nominal external dimensions are assigned to the particles of the catalyst charge, then according to one aspect of the invention, the edge lengths of the imaginary cuboid correspond to the corresponding actual external dimensions of the catalyst particles.

These actual external dimensions could for example be determined by measurements using a sliding caliper. This corresponds to the determination of three Feret diameters, which are perpendicular to one another in each case and the product of which constitutes the volume of a cuboid delimiting the particle. Different measured values or edge lengths and therefore different volumes result, depending on the orientation, relatively to the particle, of the trio of the three measured values, which are perpendicular to one another. For the purposes of the invention, decisive for each particle is the cuboid with the minimal volume delimiting the particle and the shortest edge length for the cuboid. The desired mass fraction is determined by a weighing process with subsequent summation, wherein the weight of individual particles is determined and added up.

The shortest edge length to be used as a basis for the spacing of neighbouring measuring points is the shortest edge length of the cuboid or associated particle, with which during the summation of the weights of the individual particles in the sequence of the size of the respective shortest edge lengths, starting with the particle with the largest of the shortest edge lengths, a weight fraction of at least 70% of the catalyst charge is achieved.

The shortest edge lengths can be determined in a manner, which is substantially simpler and faster and suitable for industrial application, on the basis of the actual dimensions of the particles, by a sieving process and a subsequent weighing process.

Thus, the catalyst charge can be classified dry in a sieve tower using a laboratory sieving machine. The sieve tower has a multiplicity of slotted sieves with predetermined slot widths and a predetermined grading of the slot widths. The sieved material—the catalyst charge—is loaded onto the top slotted sieve with the largest slot width. The shortest edge length of an imaginary cuboid, which delimits the catalyst particle with minimal volume, determines whether the particle falls through the gap or slot or remains on the slotted sieve. After the end of the sieving process, the fractions of the catalyst charge which have stayed lying on the individual sieves are weighed and thus each mass fraction of the total mass of the catalyst charge is determined for the particles lying on a slotted sieve.

By summation of the mass fractions in the sequence of the slotted sieves, starting at the top slotted sieve, until the desired total fraction of at least 70% is achieved, the cuboid (the particle) or the slotted sieve, the shortest edge length of which or the slot width of which is decisive for the purposes of the invention, is determined.

If the summation of the weight/mass fractions up to a slotted sieve n gives the desired total fraction (e.g. exactly 70%), then the slot width of this slotted sieve n is determined as the decisive shortest edge length.

If the desired total fraction is between the total fractions up to slotted sieves n and n+1, then the decisive shortest edge length is determined by linear interpolation between the slot widths of these two slotted sieves in relation to the mass fractions thereof.

If the reaction tubes and the thermotubes should be filled with a homogeneous catalyst charge, a representative random sample can be removed from the same, for example using a riffle divider. This sample is then supplied to the sieve tower instead of the whole catalyst charge and classified and evaluated dry as described above.

The slotted sieves provided for determining the particle size distribution are described in more detail in DIN 4185-3, e.g. the 1965 edition. In the design provided in a preferred embodiment, the sieves have sieve grates with profile bars, which have parallel surfaces in the top region thereof, that is to say e.g. profile bars with parallel head or parallel top head according to the examples 5.1.1.2 or 5.1.1.4 of the standard. The slot spacings are preferably set using spacer discs according to example no. 5.1.2 of the standard, preferably to 0.05 mm. The sieving method to be used is standardized in the standard DIN 66165-1 (Fundamentals) and DIN 66165-2 (Procedure).

In a beneficial configuration of the invention, a protective tube is arranged in the catalyst charge of the thermotube and the optical waveguide runs with capillary tube in the protective tube. Although the optical waveguide is already guided in a capillary tube, the optical waveguide with capillary tube is preferably also arranged in a protective tube in the catalyst charge of the thermotube. In addition to the protection from mechanical damage to the capillary tube and the optical waveguide by catalyst particles, the protective tube prevents the capillary tube with optical waveguide from getting caught on catalyst particles when introduced into the catalyst charge and/or from being bent locally by these catalyst particles, as a result of which the spacings between neighbouring measuring points could be changed. The protective tube therefore ensures that the optical waveguide retains its straight course in the capillary tube and therefore the spacings between neighbouring measuring points.

Preferably, the mass fraction is at least 80%, further preferably at least 90% and particularly preferably at least 95%. With a mass fraction that is getting larger, i.e. with shorter "shortest edge length", it is even ensured in the case of catalyst charges with a very broad scattering and a relatively large fraction of catalyst particles, that the dimensions of these smaller catalyst particles—i.e. the shortest edge length of the cuboid delimiting the catalyst particles with minimal volume is sufficiently taken into account.

An optical waveguide used in a tube reactor according to the invention preferably has a doped glass fibre, particularly preferably made from quartz glass, in its core, with an outer diameter in the range from 0.05 to 0.25 mm. For mechanical protection, the glass fibre is preferably surrounded by a fibre sheath, which has a thin coating on the outer side thereof. The outer diameter of the optical waveguide including the coating lies in the range from 0.1 to 0.4 mm, preferably between 0.15 and 0.25 mm.

For further mechanical protection, the optical waveguide is guided into the capillary tube. The material thereof does not have to fulfil any particular requirements except that it must continuously withstand the operating temperature of the process. Preferably, the capillary tube consists of steel. For simplicity, in the following the capillary tube including the optical waveguide is also termed the measuring capillary. The inner diameter of the capillary tube is dimensioned such that a diameter difference of between 0.35 mm and 0.5 mm remains with respect to the outer diameter of the optical waveguide, so that the optical waveguide can easily be introduced into the capillary tube. The capillary tube may also be a bendable metal tube, e.g. in the realization as a metal spiral hose.

However, a capillary tube is preferably hard and straight, so that it can easily be inserted into the protective tube. As a measuring capillary is still very sensitive to mechanical damage; the protective tube is used for the further protection thereof.

During transport, the capillary tube is protected from buckling, for example by packing in a stable tube. In the case of tight transport spatial conditions, it may make sense to manufacture the capillary tube from a soft metal. One can achieve this in that a hard standard capillary tube is annealed and thus the hardness thereof is lowered. A soft annealed steel tube of this type can be wound onto a roll and transported well. Before this soft steel tube is introduced into the protective tube, it must first be bent straight again. This can take place for example by a simple device, in which the steel tube is guided in rollers and bent in such a manner that it gets back its original straight form again.

A protective tube is preferably likewise a straight tube made from hard material and is introduced in one piece into a thermotube. If required, it can e.g. be elongated easily in that two straight and stub ends are connected to one another using a socket that is as small as possible but stable.

A protective tube preferably likewise consists of steel and has a wall thickness between 0.4 mm and 1.2 millimeters, preferably a wall thickness between 0.8 mm and 1.1 mm. To limit the wall effect influencing the reaction, the outer diameter of the protective tube is as small as possible, but the inner or clear cross section is so large that the measuring capillary can be introduced into the protective tube without hindrance. The protective tube preferably has an outer diameter of between 2.0 mm and 4.0 mm and particularly preferably between 2.6 mm and 3.2 mm.

An exemplary embodiment of a thermotube could have a protective tube with an outer diameter of 4.0 mm and an inner diameter of 2.0 mm. A capillary tube is located therein, with an outer diameter of 1.6 mm and an inner diameter of 0.6 mm, in which an optical waveguide with an outer diameter of 0.25 mm is located. If higher demands are placed on the measurement accuracy, it is necessary to check whether the dimensions can be reduced, e.g. whether a protective tube with an outer diameter of 3.2 mm and an inner diameter of 2.0 mm can be used or whether the wall thickness of the protective tube can be reduced less severely and instead the dimensions of the parts placed in the protective tube can be adapted.

Both in the case of a testing reactor with only one tube—a thermotube—and in the case of a large reactor additionally with a multiplicity of reaction tubes, the reactor is usually initially assembled by the manufacturer including protective tube(s) and erected at the intended location.

During installation, the still empty protective tube with spacers is preferably guided on the tube axis into the thermotube, which is still free of catalyst. The central location in the tube is important, because the highest reaction temperature is to be expected there in the radial direction. The axial spacing of two neighbouring spacers is preferably 10- to 30-times the inner diameter of the tube. Subsequently, the measuring capillary is guided into the protective tube. The protective tube can either be in one piece or composed of a plurality of parts. Optionally, the protective tube can also be strain-relieved using a compensator.

In a beneficial development of the invention, in the axial thermotube section of predetermined length, the spacing of neighbouring measuring points in the axial direction of the thermotube is 1- to 3-times and more preferably 1- to 2-times the said shortest edge length. The less the spacings of neighbouring measuring points deviate from the decisive particle size, the lower is the risk that a hot spot develops between the measuring points in an undetected manner.

The spacings of neighbouring measuring points are preferably identical. In certain cases, the spacings may however also be determined differently. For example, the spacings in critical areas—e.g. where the hotspots may occur—can be chosen to be smaller, e.g. 1-times the said shortest edge length. In the remaining areas, spacings of e.g. 2-times the said shortest edge length could be provided. This grading is still precise enough in the non-critical areas in order to record a virtually continuous temperature profile. By reducing the number of measuring points, the measuring speed can on the other hand be increased considerably. The measuring point density can either be designed for a larger spatial resolution—i.e. for smaller spacings—with lower measuring or evaluation speed or for high evaluation speed with lower spatial resolution.

Advantageously, in the axial thermotube section of predetermined length, the spacing of neighbouring measuring points in the axial direction of the thermotube is at least 0.5 mm. For a spacing of neighbouring measuring points of 0.5 mm, the mutually connected temperature values merge to give a virtually continuous temperature profile in the longitudinal direction of the thermotube. If the spacings of neighbouring measuring points were even smaller than 0.5 mm, then this would no longer lead to a change of the evaluated temperature profile, as no independent hot spots occur inside this interval. These hotspots would therefore also no longer be detectable, because as for every elongated thermometer, there is also temperature conduction in the axial direction, as a result of which the temperature profile is always "smoothed" somewhat. However, in the case of the short radial heat conduction paths present here and the high axial measuring point density, this effect is negligible.

The spacings of neighbouring measuring points on the optical waveguide are preferably at most 9 mm and are further preferably set to a size range of 1 to 4 mm.

Although there are discrete temperature measuring points. the spacings of such neighbouring temperature measuring points are so small that when connecting the temperature measuring points, the temperature measuring points merge to form a virtually continuous temperature profile.

In a preferred embodiment of the invention, the tube reactor additionally contains at least one catalyst-filled reaction tube. In order to keep the deviation of the reaction conditions and therefore of the temperature profile of the thermotube from a reaction tube with the same dimensions as low as possible, the catalyst charge should correspond to that of the reaction tubes with regards to the reaction effect thereof.

In a tube reactor of this type, which is used for example with a thermotube and a reaction tube as a testing device, one can compare the temperature profiles of reaction tubes with and without temperature measuring device indirectly by known methods. It is possible to draw a conclusion about the conditions in a reaction tube from the temperatures in a thermotube by the comparison results obtained.

If a multiplicity of reaction tubes and a smaller number of thermotubes are provided, then one obtains a classic tube bundle reactor with tube numbers of between 1000 and 55,000, preferably between 15,000 and 40,000 tubes. In a reactor of this type, the thermotubes and the reaction tubes are arranged as a preferably circular or annular tube bundle; the ends thereof are fastened in a sealing manner in tube sheets and a fluid heat-transfer medium flows around them during operation. The reactor furthermore has a reactor jacket, which surrounds the tube bundle, a gas inlet cover, which spans one of the tube sheets, and a gas outlet cover, which spans the other tube sheet, wherein the reaction tubes and the thermotubes are in flow connection with the gas inlet cover and the gas outlet cover. The dimensions of a tube bundle reactor of this type otherwise correspond to those of known designs. Sampling points for the reaction gas at the start and at the end of the thermotubes or reaction tubes are preferably not provided here. The features according to the invention are not limited to use in the previously described tube bundle reactors. They may similarly be used e.g. in tube bundle reactors with a plurality of heat-transfer medium zones or in tube bundles with a cross section which is not circular or not annular. The heat-transfer medium used is likewise not limited further. Thus, heat transfer oils, ionic liquids or else evaporating heat-transfer media such as water can also be used. A preferred heat-transfer medium is liquid salt however. The selection of the heat-transfer medium is determined as a function of the optimum temperature of the process and operational considerations.

In a beneficial development of the invention, the optical waveguide, the capillary tube and the protective tube are temperature-resistant to 1000° C., further preferably to 800° C. and particularly preferably temperature-resistant to 700° C. Conventional optical waveguides with standard fibres operate at temperatures between −50° C. and 300° C. The temperatures in catalytic gas phase reactions for the most part lie in the range between 300° C. and 500° C. however. The hot spot temperatures may locally be somewhat higher still. According to one aspect of the invention, optical waveguides with a high temperature resistance of 1000° C., preferably up to 800° C. and particularly preferably up to 700° C. are therefore used. In optical waveguides for the evaluation of Raman, Rayleigh, or Brillouin scattering, it must be ensured that the base material of the optical waveguide used is suitable for the operating temperatures provided. When utilizing the scattering on a Bragg grating, the corresponding optical waveguides are toughened in accordance with a method according to the prior art, e.g. by means of a suitable heat treatment.

In an advantageous embodiment of the invention, the evaluation unit is set up to evaluate optical signals created by Raman scattering, and/or by Rayleigh scattering, and/or by Brillouin scattering. By evaluating the scatterings, it is possible to determine the measuring points to be evaluated arbitrarily along the optical waveguide and to arrange the measuring points at arbitrarily small spacings.

In a further, likewise preferred embodiment of the invention, the evaluation unit is configured to evaluate optical signals created by scattering on Bragg gratings. Bragg ratings are discreet, stationary measuring points. The evaluation of the optical signals created there is relatively simple and therefore also only requires a relatively small computing capacity.

In this case, at least two optical waveguides with in each case one axially running series of Bragg gratings are advantageously located in the protective tube, wherein the Bragg gratings of the series are axially offset with respect to one another, and at least in the one axial thermotube section of predetermined length, the measuring points, formed by the Bragg gratings and offset with respect to one another, have the said spacing of neighbouring measuring points, and the evaluation unit has a device, which assembles the optical signals reflected by the at least two optical waveguides to form a single continuous series of measured temperature values. Using this measure, optical waveguides with in each case one series of Bragg gratings can be used, which have a larger spacing from the neighbouring Bragg grating of the same series than is required or desired. In particular, using this measure, spacings can also be realized between neighbouring Bragg gratings, which are smaller than the minimum spacings between neighbouring Bragg gratings of the same series.

The advantage in the evaluation of the Bragg grating backscattering, lies in the fact that in the event of a temperature change, only the wavelength of the corresponding Bragg gratings is shifted. The evaluation of this signal is relatively simple and therefore very fast, which leads to an evaluation speed virtually in real time. Due to the axial offset, so many Bragg gratings are placed in the spacing or the "gap" between two Bragg gratings of a first optical waveguide, that the measured values missing there are covered by the at least one parallel further optical waveguide. Depending on the spacings between neighbouring Bragg gratings of an optical waveguide, the length of a Bragg grating and desired resultant resolution, a few parallel optical waveguides are sufficient in order to obtain a resolution which is comparable with an evaluation e.g. of the Raman scattering.

In a preferred embodiment, the various optical waveguides with the offset Bragg gratings are assembled in an evaluation unit with multiplexer to form an assembled continuous temperature profile.

Advantageously, each optical waveguide is strain-relieved. As a result, the evaluation of the reflected optical signals is facilitated considerably, as all changes only relate to temperature changes.

As optical waveguides are generally sensitive to temperature changes and strain changes, but here only the temperatures should be measured, the optical waveguides are strain-relieved. In the simplest case this takes place in that sufficient play is present between the optical waveguide and the capillary tube. If the thermotubes are erected vertically—as is preferably the case—the optical waveguide can move freely in the capillary tube and is kept free from strains caused by mechanical forces.

In optical waveguides with Bragg gratings, the Bragg gratings can furthermore be fastened on the optical waveguide as separate sensors in an axially spaced manner, e.g. by a spliced connection. This type of connection is a conventional connection technology for optical waveguides. Specifically, small optical waveguide sections with Bragg gratings are fastened to the main fibre by local fusing. The Bragg gratings are decoupled from one another in this manner. Local strains only act on the optical-waveguide main fibre, which does not deliver any contribution to determining the temperature. The strain decoupling can be improved further in that the Bragg gratings are surrounded by a piece of glass capillary in each case. A further option for strain relief is reducing the friction by embedding the optical waveguide together with a fabric layer in the capillary tube.

In a beneficial development of the invention, the evaluation unit has a device which removes external signals from the evaluated temperature profile.

The optical signals of an optical waveguide may be disrupted during operation by vibrations which occur in a planned or unplanned manner. For example, these may be the vibrations of circulation pumps for the heat transfer medium or of other machines in the direct vicinity of the reactor. The evaluation unit is preferably set up to filter out such interference signals.

In an advantageous embodiment of the invention, the tube reactor additionally contains a heat transfer medium thermotube, which is free of catalyst material and is closed at the ends thereof against the ingress of reaction gas or product gas and into which at least one temperature-sensitive optical waveguide, which is surrounded by a capillary tube, or a thermometer with a different measuring principle extends, which optical waveguide or thermometer can be connected to the source for optical signals and to the evaluation unit, wherein the capillary tube is connected in a thermally conductive manner to the heat transfer medium thermotube wall.

A heat transfer medium thermotube allows the measurement of the axial temperature of the heat transfer medium. By using a plurality of such heat transfer medium thermotubes at various radial positions in the tube bundle, one obtains a statement about the radial temperature gradients of the heat transfer medium over the reactor cross section.

Thermal contact with the heat transfer medium thermotube wall can take place in various ways. One possibility is the arrangement of the capillary tube on the tube access and filling the annular space between the outer wall of the capillary tube and inner wall of the heat transfer medium thermotube with a thermally conductive inert material. A different way is fastening the capillary tube directly to the inner wall of the heat transfer medium thermotube. The positioning is ensured in both cases by suitable spacers. These may, if appropriate, also contain spring elements, the materials of which are preferably temperature-stable.

The temperature measurement by optical waveguides can be combined with a temperature measurement according to the prior art as an additional or partially redundant measuring system.

To check the absolute temperature, e.g. in addition to the optical waveguide, a stage thermocouple may be arranged in the heat transfer medium thermotube in parallel next to the optical waveguide.

In a development of the invention, the thermotubes have elevations on at least one of the two ends thereof, using which the thermotubes can quickly be differentiated from the surrounding reaction tubes. These elevations preferably consist of elongations of the thermotubes, which then protrude in a collar-shaped manner from the tube sheet. These elongations preferably have the same inner and outer diameters as the thermotubes and preferably welded flush to the same. The height of the elevations lies in a range between 4 and 25 mm and preferably between 8 and 15 mm.

Thermotubes for measuring the heat transfer medium temperature are for example closed at the lower ends thereof. A stopper made from metal and provided with a blind hole is preferably welded into the thermotube as closure element. The stopper is preferably drilled in such a manner that a stopper wall thickness is left over in the region of the blind hole, which corresponds to the nominal wall thickness of the thermotube, with a tolerance of −20% to +60%. The weldability is facilitated by the thin stopper wall and stresses are avoided. The depth of the blind hole lies in a range between 4 and 10 mm, preferably between 5-8 mm. A closure stopper of this type can also be used for closing defective reaction tubes.

Such an end of a thermotube, which is provided with a stopper, can easily be differentiated from the surrounding reaction tubes. It is therefore possible here to dispense with the use of an elevation for better differentiation.

The elevations can also be realized differently as tube sections, for example as webs outside of the thermotube cross section, which clearly display the position of the thermotube however. To this end, the webs can for example have an arrow shape or triangular shape, which preferably only adjoin the cross section of the corresponding thermotubes.

The elevations can likewise be realized as negative elevations, in that e.g. markings, such as arrows are stamped into the tube sheet. Such negative elevations are harder to recognize, however, than the previously mentioned positive elevations.

In a further embodiment of the invention, the elevations of the thermotubes for measuring the catalyst temperature can furthermore be different from those of the thermotubes for measuring the heat transfer medium temperature, for example by means of notches, holes, protuberances or by means of applied elements.

BRIEF DESCRIPTION OF THE DRAWINGS

The invention is explained by way of example in more detail in the following on the basis of the drawings. In the figures:

FIG. 7b is a cross section along line VIIb-VIIb in FIG. 7a;

DETAILED DESCRIPTION OF THE PRESENTLY PREFERRED EMBODIMENTS

Figure 1:
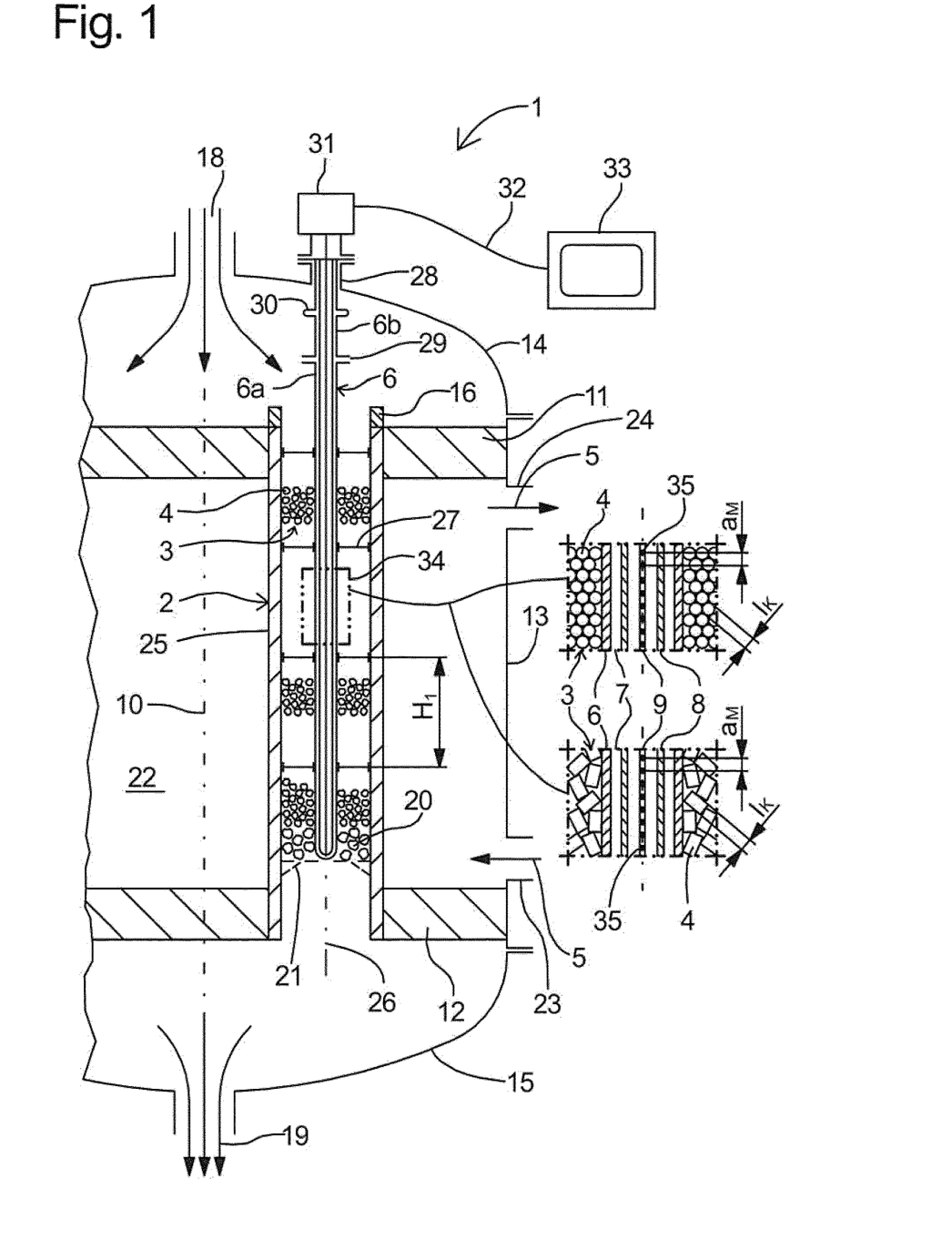
FIG. 1 is a vertical section through a tube reactor in a schematic illustration, with an enlarged illustration of a thermotube.

The exemplary embodiment of a tube reactor 1, according to the embodiment illustrated in FIG. 1, has at least one thermotube 2. The thermotube 2 is filled with a catalyst charge 3, which consists of particles 4. During operation, a fluid heat transfer medium 5 flows around the thermotube 2. A protective tube 6 extends into the catalyst charge 3, in the interior 7 of which protective tube, an optical waveguide 9 surrounded by a capillary tube 8 runs.

The tube reactor 1 illustrated in FIG. 1 is a tube bundle reactor. A bundle of vertically running catalyst-filled reaction tubes (not illustrated) is arranged in a circular or annular manner around the longitudinal axis 10 of the tube bundle reactor 1. For reasons of clarity, the reaction tubes are not illustrated in FIG. 1, rather one thermotube 2 is illustrated exclusively. In order to be able to illustrate the details in the interior 7 of the thermotube 2 clearly and unambiguously, the thermotube 2 is illustrated with an oversized diameter and is not to scale.

The ends of all reaction tubes and thermotubes 2 are fastened in a sealing manner in an upper or lower tube sheet 11, 12. A reactor jacket 13 surrounds the tube bundle and is likewise connected in a sealing manner to the two tube sheets 11, 12. The upper tube sheet 11 is spanned by an upper reactor cover 14 and the lower tube sheet 12 is spanned by a lower reactor cover 15. The ends of each reaction tube and each thermotube 2 open into the upper and into the lower reactor cover 14, 15.

In the exemplary embodiment illustrated, the thermotube 2 has an elevation 16 at the upper end thereof, in order to be able to better differentiate the thermotube from reaction tubes. In addition, the elevations of thermotubes 2 with which the catalyst temperature is measured can be constructed differently from elevations of heat transfer medium thermotubes 17 (FIGS. 9 and 10), in order to be able to differentiate them from one another.

The reaction gas mixture 18 is supplied to each reaction tube and each thermotube 2 by a, in the exemplary embodiment illustrated by the upper, reactor cover 14 and discharged again from these tubes by the other, in the case illustrated lower, reactor cover 15 as product gas mixture 19. In addition to catalyst material 3, the reaction tubes and the thermotubes 2 can, if appropriate, also contain inert material 20, in order to control the reaction. A so-called catalyst holder 21 is fastened in the lower end region of the thermotube 2 and each reaction tube, which catalyst holder carries the catalyst/inert charge 3, 20.

The two tube sheets 11, 12 and the reactor jacket 13 delimit a heat transfer medium space 22, into which a fluid heat transfer medium 5 is supplied by a supply line 23 and out of which the heat transfer medium 5 is discharged again by a discharge line 24 and in which the fluid heat transfer medium 5 flows around the reaction tubes and the thermotubes 2 on the outer sides 25 thereof.

The illustrated tube reactor 1 has only one heat transfer medium circuit. The number of independent heat transfer medium circuits or heat transfer medium zones is not limited in a tube reactor according to the invention however.

The protective tube 6 is arranged on the tube axis 26 of the thermotube 2 in the illustrated exemplary embodiment and extends through the whole catalyst charge 3 to the downstream end of the catalyst charge 3. The protective tube is centred in the centre of the thermotube 2 by spacers 27. The spacers 27 extend between the inner wall of the thermotube 2 and the outer wall of the protective tube 6 and are arranged in the longitudinal direction of the thermotube 2 at suitable axial spacings $H_1$, preferably arranged at an axial spacing which is 10- to 30-times the inner diameter of the thermotube 2.

The protective tube 6 extends through the upper reactor cover 14. This has a temperature measurement connector 28, through which the protective tube 6 is guided out of the reactor cover and to which the upper end of the protective tube 6 is fastened.

The protective tube 6 is divided into two parts. The connection of the two protective tube parts 6a, 6b takes place using flanges 29, which may be any desired detachable connection, e.g. a clamping-ring or cutting-ring connection. So as not to impair length changes of the protective tube 6 as a consequence of temperature changes, the connection of the two protective tube parts 6a, 6b is axially movable.

The protective tube 6 also has a compensator 30 that can accommodate length changes of the protective tube 6.

The connection of the two protective tube parts 6a, 6b and the compensator 30 are both arranged in the upper reactor cover 14 in the illustrated exemplary embodiment.

The guiding of signal cables and the surrounding capillary tubes 8 or protective tubes 6 through or out of the reactor cover 14 may take place in a similar manner to that described in EP 2 075 058 B1, with compression gland seals, compensators and the like.

A capillary tube 8 hangs freely in the protective tube 6, in which capillary tube an optical waveguide 9 is located and can likewise move freely. Both the capillary tube 8 and the optical waveguide 9 are therefore strain-relieved.

The optical waveguide 9 extends over the entire length of the capillary tube 8 and opens outside of the reactor 1 into an optical waveguide coupling 31, which is flanged on the temperature measurement connector 28 in the illustrated exemplary embodiment.

The optical waveguide coupling 31 can however also be installed separately from the reactor 1 next to the same, in order to avoid transmission of reactor vibrations to the optical waveguide coupling 31.

Signal transmission of the device according to the invention is not bound to a certain concept. Thus, the optical signals can be evaluated on site using an evaluation unit integrated into the optical waveguide coupling 31 and, if appropriate, forwarded via a line 32 to a process control system 33. This can take place in a wired manner or via wireless transmission. The optical signals can be transported just as well to a spatially remote evaluation device, using a pure transport optical waveguide, and evaluated there. The temperature measurement and evaluation is preferably executed automatically by a program.

In FIG. 1, a detail from the thermotube 2 is illustrated on an enlarged scale in two variants with differently shaped catalyst particles 4. The detail belongs to the axial thermotube section 34, in which the occurrence of the maximum reaction temperature in the thermotube 2—i.e. the occurrence of the hot spot—is expected.

In the top variant in FIG. 1, the catalyst particles 4 are spherical, as illustrated in FIG. 2. In the bottom variant, the catalyst particles 4 are hollow cylindrical, as illustrated in FIG. 3. The optical waveguide 9 has a series of measuring points 35. The spacing am of neighbouring measuring points 35 in the axial direction of the thermotube 2 in this thermotube section 34 is determined as a function of the size of the catalyst particles 4 in this thermotube section 34.

Catalyst particles 4 may be shaped differently. In FIGS. 2 to 4, variously shaped catalyst particles 4 are reproduced by way of example. A catalyst charge 3 preferably consists of identically shaped catalyst particles 4.

Independently of the shape of the catalyst particles 4, the size of the spacing am of neighbouring measuring points 35 on the optical waveguide 9 lie in the range from 0.8- to 5-times the shortest edge length $l_K$ of all imaginary cuboids, which delimit particles 4 with minimal volume and which fulfil the predetermined conditions:

If the nominal external dimensions of the catalyst particle 4 are known, for example in the case of spherical particles 4 (FIG. 2), the outer diameter $D_K$, in the case of cylindrical or hollow cylindrical particles 4 (FIG. 3), the (hollow) cylinder outer diameter $D_Z$ and the (hollow) cylinder length $L_Z$ and in the case of Berl saddles (FIG. 4), the length $L_B$, the width $B_B$, the height $H_B$ (FIG. 4), the shortest edge length $l_K$ of all imaginary cuboids, which with minimal volume delimit one particle in each case, is decisive, assuming that the particle 4 has its nominal external dimensions. In the previously mentioned examples, this means, in the case of spherical particles, the shortest edge length $l_K$ is the nominal outer diameter $D_K$ of the particles 4, wherein in the case of particles 4 with different nominal outer diameters $D_K$ in the catalyst charge 3, the smallest nominal outer diameter $D_K$ is the shortest edge length $l_K$, in the case of (hollow) cylindrical particles 4, the shortest edge length $l_K$ is the smallest of the nominal external dimensions diameter $D_Z$ or cylinder length $L_Z$, wherein in the case of (hollow) cylinders with different nominal external dimensions in the catalyst charge 3, the absolutely smallest of the nominal external dimensions $D_Z$, $L_Z$ is the shortest edge length $l_K$, in the case of Berl saddles, the shortest edge length $l_K$ is the smallest of the nominal external dimensions length LB, width $B_B$, height $H_B$, wherein here also in the case of Berl saddles with different nominal external dimensions in a catalyst charge 3, the absolutely smallest of the nominal external dimensions $L_B$, $B_B$, $H_B$ is the shortest edge length $l_K$.

If in a catalyst charge 3, in the case of known nominal external dimensions, differently shaped catalyst particles 4 are mixed, the shortest edge length $l_K$ is the absolutely shortest edge length of all imaginary cuboids, which in each case delimit one of the differently shaped particles 4, assuming that the particle has its nominal external dimensions.

In the above-described examples, in a catalyst charge 3, which is mixed from at least two shapes of the catalyst particles 4 illustrated in FIGS. 2 to 4, the shortest edge length $l_K$ is the absolutely smallest of the above stated nominal external dimensions $D_K$, $D_Z$, $L_Z$, $L_B$, $B_B$ or $H_B$.

In the exemplary embodiment illustrated in FIG. 1, the spacing at neighbouring measuring points 35 is 1-times the said shortest edge length $l_K$.

If the nominal external dimensions of the catalyst particles 4 are not known, the spacing am of neighbouring measuring points is 0.8- to 5-times the shortest edge length $l_K$ of all imaginary cuboids, which in each case with minimal volume delimit the particles 4, which belong to a mass fraction of at least 70% of the catalyst charge 3, to which all particles 4 with imaginary cuboids belong, for which each edge length is longer than the shortest edge length $l_K$.

An ideally mixed catalyst charge 3 may be taken as an example, from which a representative sample has been taken. This sample is classified dry in a sieve tower using a laboratory sieving machine. The sieve tower consists of a multiplicity of slotted sieves with slot widths of between 3.4 mm and 4.6 mm with a spacing of the slot widths of 0.05 mm. The sieved material—the sample—is loaded onto the top slotted sieve with the largest slot width. The shortest edge length of the cuboid, which delimits a catalyst particle 4 with minimal volume, determines whether the particle 4 falls through the slot or gap or remains thereon. The result of the sieving is illustrated in a table in FIG. 5 and graphically as a histogram $q3(x)$ and cumulative distribution curve $R(x)$ in FIG. 6.

Figure 5:
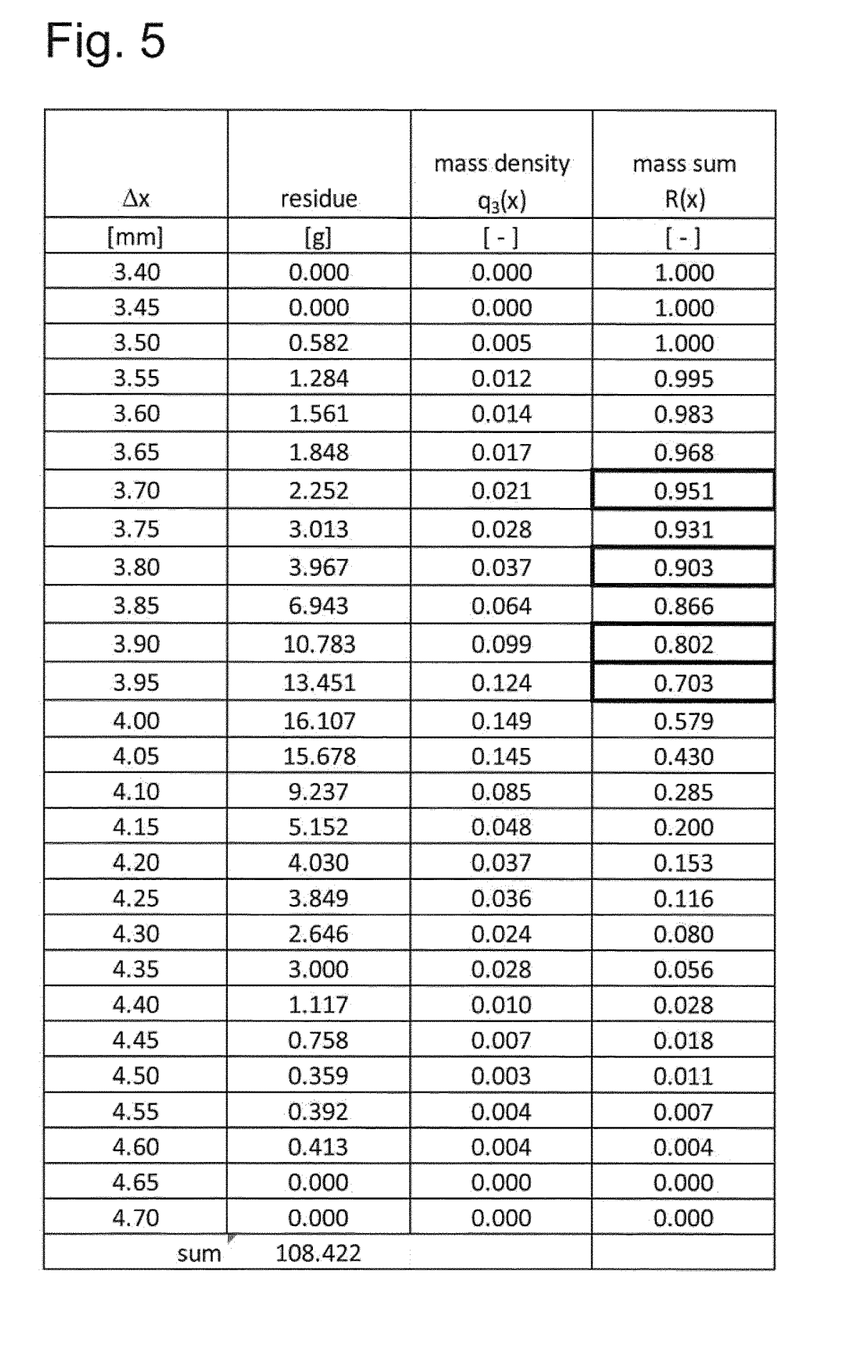
FIG. 5 is a table with the results of a sieving process in a sieve tower.
Figure 6:
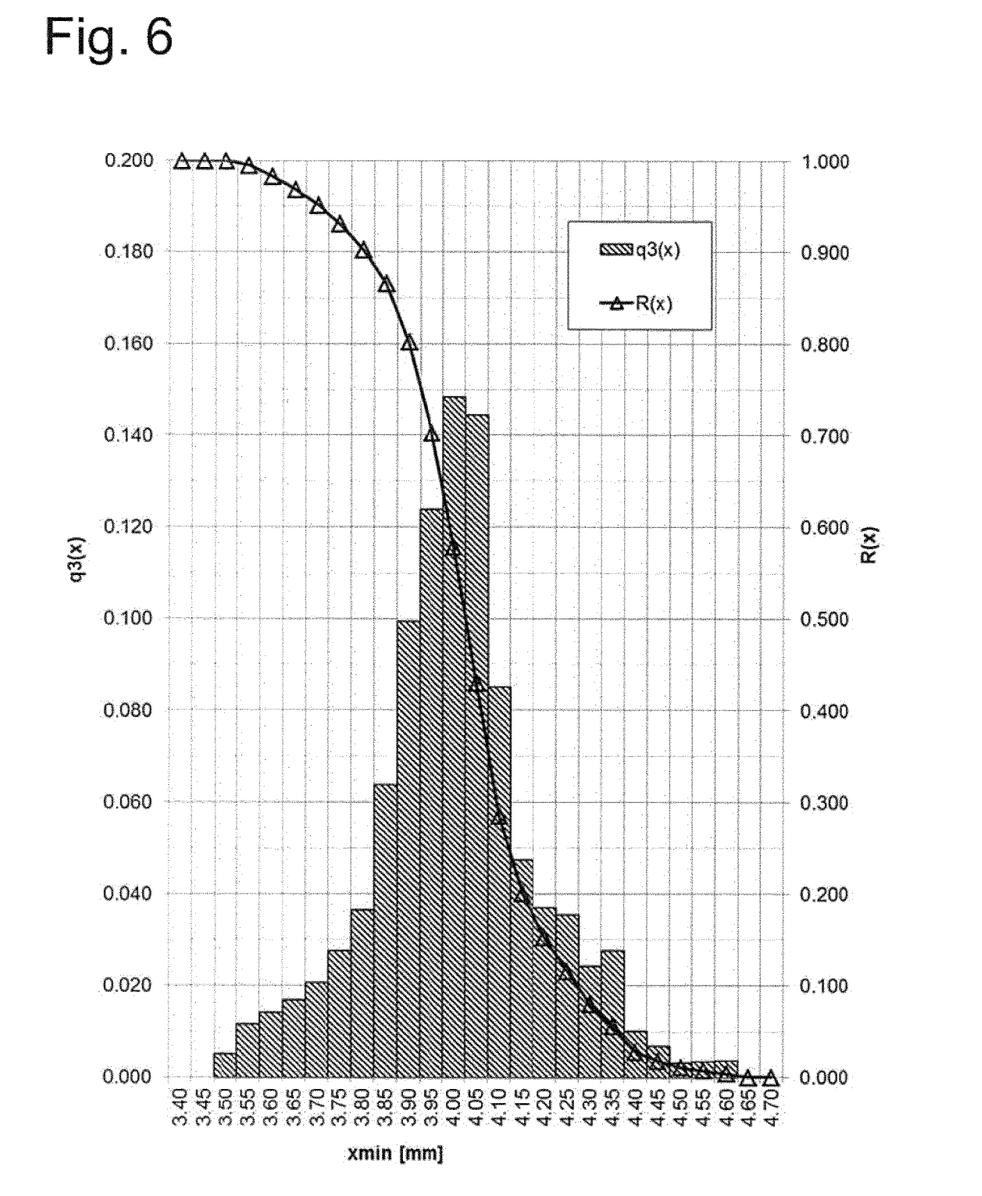
FIG. 6 is a graph in which the results from FIG. 5 are illustrated as a histogram and as a cumulative distribution curve.

For example, a mass fraction $q3(x)$ of 0.124 has been retained on the sieve with the slot width 3.95 mm. This mass fraction $q3(x)$ is also termed the mass density. This residue contains all catalyst particles 4, the decisive external dimension (shortest edge length) of which is larger than 3.95 mm and at most is 4.00 mm (next largest sieve slot width). Together with all mass fractions of the larger sieve classes, a summed mass fraction $R(x)$ or else a mass sum of 0.703, corresponding to 70.3% results. All other catalyst particles have a decisive external dimension which is 3.95 mm or smaller, so that in this particle size distribution, the dimension of 3.95 mm forms the shortest edge length $l_K$ for a mass fraction of 70.3%. The dimension of 3.95 mm therefore fulfils the criterion for a mass fraction of at least 70% in the sense of this invention. Accordingly, the dimension of 3.90 mm with a mass fraction of 80.2% fulfils the criterion for a mass fraction of at least 80%, the dimension of 3.80 mm with a mass fraction of 90.3% fulfils the criterion for a mass fraction of at least 90% and the dimension of 3.70 mm with a mass fraction of 95.1% fulfils the criterion for a mass fraction of at least 95%.

If the in each case decisive external dimensions (shortest edge lengths) for mass sums are desired, which cannot be read directly from the table in FIG. 5, then linear interpolation is carried out between the slot widths for the mass sums lying thereabove and therebelow.

Figure 7A:
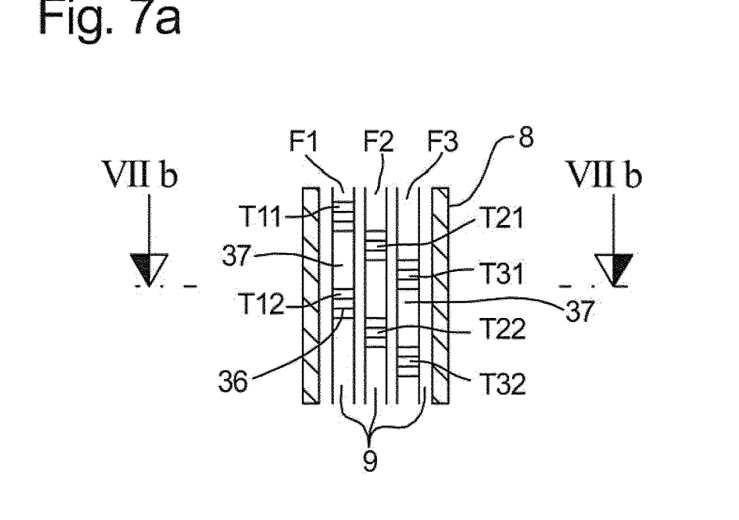
FIG. 7a is a partial longitudinal section through a capillary tube of a tube reactor, wherein three optical waveguides with Bragg gratings are arranged in the capillary tube.
Figure 7B:
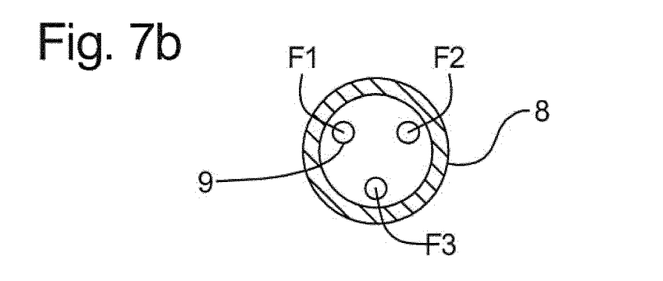

The FIGS. 7a and 7b show three optical waveguides 9 or optical fibres $F_1$, $F_2$, $F_3$, which are provided with Bragg gratings 36 and arranged together in a capillary tube 8. The Bragg gratings 36 form measuring points 35, which are designated individually as $T_{11}$, $T_{12}$, $T_{21}$, $T_{22}$, $T_{31}$, $T_{32}$ in FIG. 7a. The spacing between the two Bragg gratings 36 illustrated for each optical waveguide 9 is identical for all three optical waveguides 9. However, the optical waveguides 9 are offset with respect to one another in the axial direction, so that at the height of the intermediate space 37 between two Bragg gratings 36 of an optical waveguide 9, one Bragg grating 36 in each case of the two other optical waveguides 9 is located. That is to say, between two measuring points 35 of an optical waveguide 9, there are two further measuring points 35 in each case, namely in the exemplary embodiment, one measuring point 35 in each case from the two other optical waveguides 9. The resulting measuring point spacing inside the capillary tube 8 is therefore only a third of the measuring point spacing on each optical waveguide 9.

The optical waveguides 9 can be embedded into a fabric layer (not illustrated) for strain relief.

Figure 8:
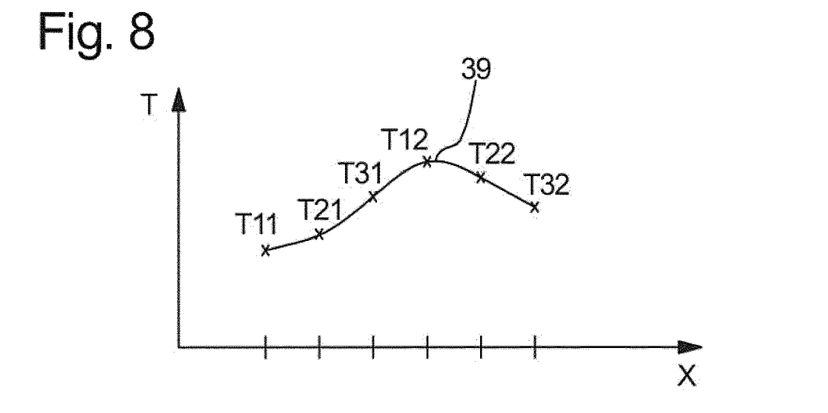
FIG. 8 is a graph with the temperature profile of the measuring points of FIGS. 7a and 7b.

FIG. 8 shows a temperature profile of the measuring points $T_{11}$, $T_{12}$, $T_{21}$, $T_{22}$, $T_{31}$, $T_{32}$ from FIG. 7a. The temperature profile shows a hot spot 39 in the vicinity of the measuring point $T_{12}$. FIG. 8 shows the temperature profile compiled by a multiplexer from the measuring points 35 of the three optical waveguides 9 from FIG. 7a.

Figure 9:
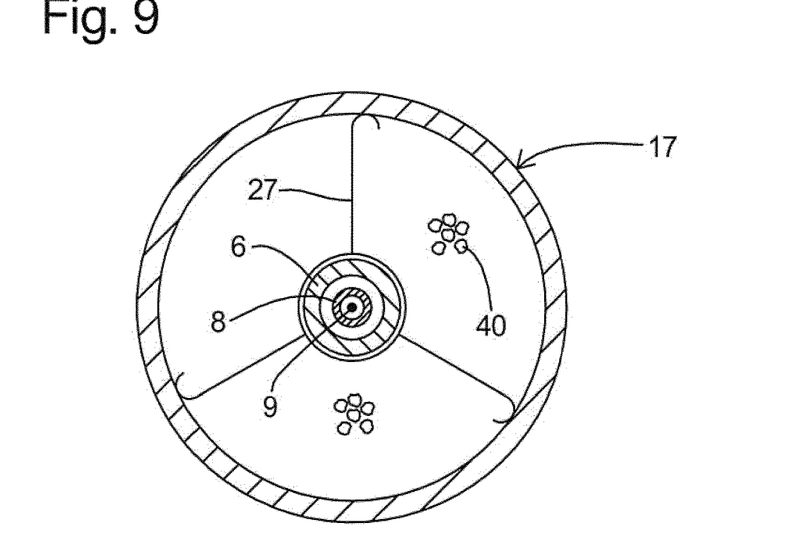
FIG. 9 is a cross section through a heat transfer medium thermotube for a tube reactor according to the invention.
Figure 10:
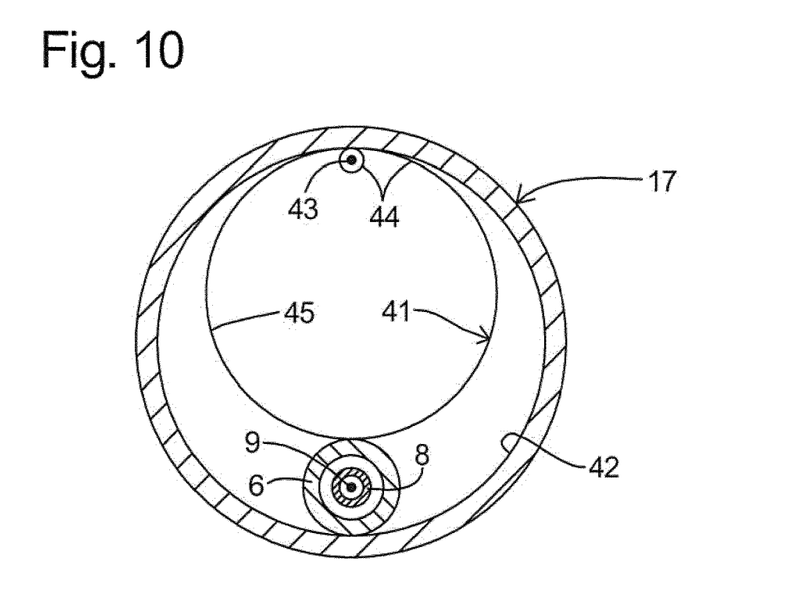
FIG. 10 is a cross section through a heat transfer medium thermotube for a tube reactor.

The FIGS. 9 and 10 in each case show a cross section through a heat transfer medium thermotube 17.

In the embodiment illustrated in FIG. 9, the centring of the protective tube 6 takes place by a three-armed spacer 27. The heat transfer medium thermotube 17 is filled with a material 40 which conducts heat well, for example with aluminium grit.

In the embodiment illustrated in FIG. 10, the protective tube 6 is pressed by a spring construction 41 onto the inner wall 42 of the heat transfer medium thermotube 17. As a result, the heat conduction distance from the inner wall 42 of the heat transfer medium thermotube 2 to the optical waveguide 9 is minimized and thus the heat conduction to the optical waveguide 9 is maximally accelerated. In the exemplary embodiment illustrated, the spring 41 consists of a coil spring 44, wound around a guide wire 43, with a radially large spring part 45.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tube reactor for heterogeneous catalysed gas phase reactions, comprising:
   a thermotube, which contains a catalyst charge having particles, wherein during operation a fluid heat transfer medium flows around an outer side of the thermotube;
   a capillary tube;
   a temperature-sensitive optical waveguide, which is surrounded by the capillary tube, extends into the catalyst charge of the thermotube, the temperature-sensitive optical waveguide having measuring points with a predetermined spacing between neighbouring measuring points in an axial direction of the thermotube and configured to be connected to a source for optical signals and to an evaluation unit for optical signals reflected by the optical waveguide,
   wherein the temperature-sensitive optical waveguide at least in an axial thermotube section of predetermined length, which contains at least part of the catalyst charge, has the measuring points with the predetermined spacing between neighbouring measuring points in the axial direction of the thermotube, which is 0.8- to 5-times a shortest edge length of all imaginary cuboids, which with minimal volume, in those cases in which nominal external dimensions are assigned to the particles of the catalyst charge, delimit one particle when the particles have its nominal external dimension, and in all other cases, in each case delimit the particles that belong to a mass fraction of at least 70% of the catalyst charge, to which all particles with imaginary cuboids belong, for which each edge length is longer than the shortest edge length.

2. The tube reactor according to claim 1, wherein a protective tube is arranged in the catalyst charge of the thermotube and the optical waveguide runs with a capillary tube in the protective tube.

3. The tube reactor according to claim 1, wherein the mass fraction is at least 80.

4. The tube reactor according to claim 1, wherein in the axial thermotube section of predetermined length, the spacing of neighbouring measuring points in the axial direction of the thermotube is 1- to 3-times the shortest edge length.

5. The tube reactor according to claim 1, wherein in the axial thermotube section of predetermined length, the spacing of neighbouring measuring points in the axial direction of the thermotube is at least 0.5 mm.

6. The tube reactor according to claim 1, wherein the tube reactor further comprises at least one catalyst-filled reaction tube.

7. The tube reactor according to claim 1, wherein the optical waveguide, the capillary tube, and a protective tube are temperature-resistant to 1000° C.

8. The tube reactor according to claim 1, wherein the evaluation unit is configured to evaluate optical signals created by at least one of Raman scattering, Rayleigh scattering, and Brillouin scattering.

9. The tube reactor according to claim 1, wherein the evaluation unit is configured to evaluate optical signals created by scattering on Bragg gratings.

10. The tube reactor according to claim 9,
    wherein at least two optical waveguides with a respective axially running series of Bragg gratings are located in a protective tube,
    wherein the Bragg gratings of the series are axially offset with respect to one another, and at least in the axial thermotube section of predetermined length, the measuring points, formed by the Bragg gratings and offset with respect to one another, have the spacing of neighbouring measuring points, and
    wherein the evaluation unit has a device, which assembles the optical signals reflected by the at least two optical waveguides to form a single continuous series of measured temperature values.

11. The tube reactor according to claim 1, wherein the optical waveguide is strain-relieved.

12. The tube reactor according to claim 1, wherein the evaluation unit has a device that removes external signals from an evaluated temperature profile.

13. The tube reactor according to claim 1, further comprising:
    a heat transfer medium thermotube, which is free of catalyst material and is closed at ends thereof against the ingress of at least one of reaction gas and product gas and into which at least one of a temperature-sensitive optical waveguide, which is surrounded by a respective capillary tube, and a thermometer with a different measuring principle extends, which optical waveguide or thermometer can be connected to the source for optical signals and to the evaluation unit, wherein the capillary tube is connected in a thermally conductive manner to a heat transfer medium thermotube wall.

14. The tube reactor according to claim 13, wherein at least one thermotube has an elevation at least at one of the two ends thereof.

15. The tube reactor according to claim 14, wherein the elevation of the thermotube for measuring a catalyst temperature are different from those of the thermotubes for measuring the heat transfer medium temperature.

16. The tube reactor according to claim 1, wherein the mass fraction is at least 90%, and particularly preferably at least 95%.

17. The tube reactor according to claim 1, wherein the mass fraction is at least 95%.

18. The tube reactor according to claim 1, wherein in the axial thermotube section of predetermined length, the spacing of neighbouring measuring points in the axial direction of the thermotube is 1- to 2-times the shortest edge length.

19. The tube reactor according to claim 1, wherein the optical waveguide, the capillary tube, and a protective tube are temperature-resistant to 800° C.

20. The tube reactor according to claim 1, wherein the optical waveguide, the capillary tube, and a protective tube are temperature-resistant to 700° C.

* * * * *